3,072,598
COMPOSITIONS OF COPOLYMERS OF VINYL AROMATIC HYDROCARBONS AND METHACRYLIC ACID AND RUBBERY COPOLYMERS CONTAINING VINYLPYRIDINE

Henno Keskkula, Midland, Mich., assignor to The Dow Chemical Company, Midland, Mich., a corporation of Delaware
No Drawing. Filed Mar. 12, 1959, Ser. No. 798,848
6 Claims. (Cl. 260—45.5)

This invention concerns thermoplastic compositions of matter consisting essentially of a predominant amount of a normally hard copolymer of one or more monovinyl aromatic hydrocarbons of the benzene series and methacrylic acid intimately incorporated with a minor proportion of a rubbery copolymer of butadiene, styrene and a vinylpyridine.

It is known to blend a normally hard thermoplastic polymer such as polystyrene or copolymers of styrene and acrylonitrile with a minor amount of a rubbery copolymer, e.g. copolymers of styrene and butadiene or acrylonitrile and butadiene, to produce compositions having improved mechanical properties such as elongation and impact strength.

It has now been discovered that compositions, the essential ingredients of which consist of a predominant amount of a normally hard relatively inelastic copolymer of one or more monovinyl aromatic hydrocarbons of the benzene series having the vinyl radical directly attached to a carbon atom of the benzene nucleus and methacrylic acid, intimately incorporated with a minor proportion of a rubbery copolymer of butadiene, styrene and a vinylpyridine posssess good mechanical properties such as tensile strength, elongation, impact strength and heat distortion temperature. It has further been found that incorporating a vinylpyridine containing rubber, i.e., a rubbery copolymer containing basic nitrogen-containing groups, with a normally hard thermoplastic vinyl aromatic polymer containing methacrylic acid groups results in at least a portion of the basic and acidic groups reacting with one another to chemically combine the basic rubber ingredient with the acidic base polymer.

The normally hard thermoplastic copolymers to be employed in the invention can be a copolymer of from about 5 to about 15 percent by weight of methacrylic acid and correspondingly from about 95 to about 85 percent by weight of one or more monovinyl aromatic hydrocarbons of the benzene series having the vinyl radical directly attached to a carbon atom of the benzene nucleus. Examples of suitable monovinyl aromatic hydrocarbons are styrene, vinyltoluene, vinylxylene, isopropylstyrene, ar-ethylvinylbenzene, tert.-butyl styrene, di-tert.butylstyrene and the like. Copolymers of the monovinyl aromatic hydrocarbons and methacrylic acid can be prepared in usual ways employed for the polymerization of styrene, e.g. by polymerizing a mixture of the monomers in bulk at temperatures between 60° and 120° C. and in the presence or absence of a per-oxygen containing polymerization catalysts such as benzoyl peroxide, tert.-butyl peroxide, di-tert.-butyl peroxide or cumene peroxide.

The rubbery vinylpyridine-containing copolymer can be a copolymer of from 60 to 80 percent by weight of butadiene-1,3, from 35 to 5 percent of styrene and from 5 to 15 percent of a vinylpyridine such as 2-vinylpyridine, 4-vinylpyridine or 2-vinyl-5-ethylpyridine, per 100 parts by weight of the rubbery copolymer. The rubbery copolymers can be prepared employing usual procedures for the making of synthetic rubbers, e.g. by polymerizing a mixture of the monomers in an aqueous emulsion at temperatures between about 0° and 100° C. in the presence of a polymerization catalyst and employing either a "hot" or a "cold" rubber recipe. The copolymer is obtained as a synthetic latex, and after separating unreacted monomers, is usually mixed with a stabilizer and the copolymer recovered in usual ways, e.g. by coagulating, separating, washing and drying the copolymer or by spreading a thin layer of the stabilized latex on heated rolls, evaporating the water and recovering the dried latex solids.

The compositions are prepared by malaxating the polymeric ingredients with one another at elevated temperatures on compounding rolls, a Banbury mixer or in a plastics extruder at temperatures between about 140° and 280° C., preferably from 160° to 225° C. for a time sufficient to form a homogeneous composition. Usually, compounding or malaxating the ingredients with one another at heat-plastifying temperatures of from 140° to 280° C. for a time of from 1 to 20 minutes is sufficient to produce a uniform composition. The ingredients should not be malaxated at the elevated temperatures for prolonged periods of time which result in deterioration of the polymers.

In preparing the compositions the hard normally solid thermoplastic polymer can be employed in proportions of from 60 to 95 percent by weight of the copolymer containing from 5 to 15 percent by weight of chemically combined methacrylic acid and correspondingly from 40 to 5 percent by weight of the rubbery copolymer containing from 5 to 15 percent by weight of the chemically combined vinylpyridine, e.g. 2-vinylpyridine, 4-vinylpyridine, 2-vinyl-5-ethylpyridine, or a mixture of such vinylpyridines.

Small amounts of additives such as plasticizers, dyes, pigments, mold release agents, fillers, stabilizing agents, antioxidants and the like can be incorporated with the compositions, but are not required. Such additives, when used, are employed in amounts corresponding to about 0.5 to 10 percent by weight of the composition. It may be mentioned that a small amount of an antioxidant or stabilizing agent is usually incorporated with the rubbery copolymer, prior to its being recovered from the latex in which it is prepared, and the addition of such antioxidant or stabilizing agent is advantageous.

The new compositions of the invention are resinous thermoplastic materials that can be molded by usual compression or injection molding procedures or by extrusion methods to form plastic articles having a high heat distortion temperature and useful for a variety of purposes in the home and industry. For example, the compositions can be molded to form boxes, radio cabinets, sheet, strip, rods, bars, toys and other articles useful for a variety of purposes.

The following examples illustrate ways in which the principle of the invention has been applied, but are not to be construed as limiting its scope.

EXAMPLE 1

(A) A copolymer of butadiene, styrene and 4-vinylpyridine was prepared by polymerizing a mixture of the monomers in an aqueous emulsion employing the recipe:

| Ingredients: | Parts by weight |
|---|---|
| Butadiene-1,3 | 70 |
| Styrene | 20 |
| 4-vinylpyridine | 10 |
| Water | 125 |
| Duponol ME (sodium salt of technical lauryl alcohol sulfate) | 3.1 |
| Potassium persulfate | 0.77 |
| NaHCO$_3$ | 1.08 |
| K$_2$SO$_4$ | 0.77 |
| Tert.-dodecyl mercaptan | 0.077 |

The emulsifying agent (Duponol ME), the potassium persulfate, the sodium bicarbonate, the potassium sulfate and the tertiary-dodecyl mercaptan were mixed with the water in a polymerization vessel, and the styrene and 4-vinylpyridine weighed out and added to the vessel. Butadiene was then added under pressure from a cylinder in the stated proportion. The mixture was agitated in the closed vessel and heated at a temperature of 60° C. for 18 hours to polymerize the monomers. The conversion to copolymer was substantially complete. There was added to the latex 4 percent by weight based on the weight of the copolymer, of 2,4-dimethyl-6-(1-methylcyclohexyl) phenol, dispersed in an aqueous emulsion, as stabilizer. The copolymer was recovered by spreading a thin layer of the latex on rolls internally heated at a temperature of about 180° C., evaporating the water and scraping the dried latex solids from the rolls. The copolymer was employed to make compositions as follows:

(B) In each of a series of experiments, a charge of a resinous copolymer of 90 percent by weight of styrene and 10 percent of methacrylic acid in proportions as stated in the following table was mixed with a charge of the rubbery copolymer prepared above and 2 parts by weight of tri-(2-ethylhexyl)phosphate as plasticizer and was compounded in a Banbury mixer at temperatures between 375° and 390° F. for a period of 10 minutes to form a homogeneous composition. Thereafter, it was allowed to cool and was ground to a granular form suitable for moulding. Portions of the composition were injection molded to form test pieces having ⅛ x ½ inch cross section. These test pieces were used to determine a tensile strength and elongation value for the composition employing procedures similar to those described in ASTM D638-49T. Impact strength was determined employing procedure similar to that described in ASTM D256-47T. Other molded test pieces were used to determine a heat distortion temperature for the composition employing a procedure of Heirholzer and Boyer (see ASTM Bull. No. 134 of May 1945). Table I identifies the compositions and gives the proportions of the rubbery copolymer and the resinous copolymer employed in making the same. The table also gives the properties determined for the composition.

*Table I*

| | Starting Materials | | | Product | | | |
|---|---|---|---|---|---|---|---|
| Run No. | Resinous Copolymer Parts | Rubbery Copolymer Parts | Plasticizer Parts | Tensile Strength, lbs./sq. in. | Elongation, percent | Notched Impact Strength ft.-lbs. | Heat Distortion Temperature, °C. |
| 1 | 93 | 5 | 2 | 8,610 | 2.8 | 0.32 | 108 |
| 2 | 83 | 15 | 2 | 6,700 | 16.1 | 0.43 | 92 |
| 3 | 73 | 25 | 2 | 4,820 | 39.0 | 3.5 | 85 |
| 4 | 63 | 35 | 2 | 2,920 | 56.3 | 15.4 | 76.5 |

EXAMPLE 2

In each of a series of experiments, a composition was prepared from a resinous copolymer of 95 percent by weight of styrene and 5 percent of methacrylic acid and a charge of the rubber copolymer prepared in part A of Example 1 and tri-(2-ethylhexyl)phosphate as plasticizer. Table II identifies the compositions and gives their properties.

*Table II*

| | Starting Materials | | | Product | | | |
|---|---|---|---|---|---|---|---|
| Run No. | Resinous Copolymer Parts | Rubbery Copolymer Parts | Plasticizer Parts | Tensile Strength, lbs./sq. in. | Elongation, percent | Notched Impact Strength ft.-lbs. | Heat Distortion Temperature, °C. |
| 1 | 93 | 5 | 2 | 7,680 | 2.6 | 0.39 | 88 |
| 2 | 83 | 15 | 2 | 5,920 | 13.4 | 0.35 | 74 |
| 3 | 73 | 25 | 2 | 3,980 | 34.3 | 4.5 | 66 |
| 4 | 63 | 35 | 2 | 1,920 | 62.6 | 15.8 | 69 |

EXAMPLE 3

In each of a series of experiments, a composition was prepared from a resinous copolymer of 85 percent by weight of styrene and 15 percent of methacrylic acid and a charge of the rubbery copolymer prepared in part A of Example I. Table III identifies the compositions and gives their properties.

*Table III*

| | Starting Materials | | | Product | | | |
|---|---|---|---|---|---|---|---|
| Run No. | Resinous Copolymer Parts | Rubbery Copolymer Parts | Plasticizer Parts | Tensile Strength, lbs./sq. in. | Elongation, percent | Notched Impact Strength ft.-lbs. | Heat Distortion Temperature, °C. |
| 1 | 93 | 5 | 2 | 8,180 | 2.6 | 0.2 | 100 |
| 2 | 83 | 15 | 2 | 6,350 | 23.8 | 0.34 | 86 |
| 3 | 73 | 25 | 2 | 4,480 | 41.4 | 3.2 | 78 |
| 4 | 63 | 35 | 2 | 2,560 | 52.2 | 15.6 | 63 |

EXAMPLE 4

In each of a series of experiments, a charge of 73 parts by weight of a resinous copolymer of 85 percent by weight of styrene and 15 percent of methacrylic acid was intimately incorporated with 25 parts by weight of a rubbery copolymer of butadiene, styrene and 4-vinylpyridine, in proportions as hereinafter stated, and 2 parts of tri-(2-ethylhexyl)phosphate as plasticizer, employing procedure similar to that employed in part B of Example 1. The composition of the rubbery copolymer employed in making the compositions and the properties determined for the compositions were as follows:

| | A | B |
|---|---|---|
| Rubbery Copolymer: | | |
| Butadiene | 70 | 80 |
| Styrene | 25 | 10 |
| 4-Vinylpyridine | 5 | 10 |
| | Properties | |
| Composition: | | |
| Tensile Strength, lbs./sq. in. | 4,580 | 4,110 |
| Elongation, percent | 6.5 | 5.4 |
| Notched impact strength, ft.-lbs. | 0.81 | 0.86 |
| Heat distortion temperature, °C. | 94 | 90 |

EXAMPLE 5

In each of a series of experiments, a charge of 73 parts by weight of a resinous copolymer of 90 percent by weight of styrene and 10 percent of methacrylic acid was incorporated with 25 parts by weight of a rubbery copolymer of butadiene, styrene and 4-vinylpyridine in proportions as hereinafter stated, and 2 parts by weight of tri-(2-ethylhexyl)phosphate as plasticizer. The compositions and their properties were as follows:

| | A | B |
|---|---|---|
| Rubbery Copolymer: | | |
| Butadiene | 70 | 75 |
| Styrene | 20 | 15 |
| 4-Vinylpyridine | 10 | 10 |
| | Properties | |
| Composition: | | |
| Tensile Strength, lbs./sq. in. | 4,940 | 4,610 |
| Elongation, percent | 35.6 | 42.1 |
| Notched Impact Strength, ft.-lbs. | 7.6 | 5.6 |
| Heat Distortion Temperature, °C. | 87 | 84.5 |

For purpose of comparison, a similar composition was prepared from the resinous copolymer and 25 parts of a rubbery copolymer of 70 percent by weight of butadiene, 10 percent of styrene and 20 percent of 4-vinylpyridine (a rubbery copolymer outside the scope of the invention). The composition had the properties:

| | |
|---|---|
| Tensile strength | lbs./sq. in. 7660 |
| Elongation | percent 2.7 |
| Notched impact strength | ft.-lbs. 0.5 |
| Heat distortion temperature | °C. 64 |

EXAMPLE 6

A composition was prepared by intimately incorporating 73 parts by weight of a resinous copolymer of 85 percent by weight of styrene and 15 percent of methacrylic acid with 25 parts by weight of a rubbery copolymer of 60 percent by weight of butadiene, 30 percent of styrene and 10 percent of 4-vinylpyridine and 2 parts by weight of tri-(2-ethylhexyl)phosphate employing procedure similar to that employed in part B of Example 1.

For purpose of comparison, a similar composition was prepared from a rubbery copolymer of 60 percent by weight of butadiene, 20 percent of styrene and 20 percent of 4-vinylpyridine, such composition being outside the scope of the invention. The compositions had the properties:

| | A | B |
|---|---|---|
| Rubbery Copolymer: | | |
| Butadiene | 60 | 60 |
| Styrene | 30 | 20 |
| 4-Vinylpyridine | 10 | 20 |
| Properties | | |
| Composition: | | |
| Tensile Strength, lbs./sq. in. | 3,150 | 8,180 |
| Elongation, percent | 27.1 | 2.4 |
| Notched Impact Strength, ft.-lbs. | 0.74 | 0.34 |
| Heat Distortion Temperature, °C. | 74 | 66.5 |

I claim:

1. A resinous thermoplastic composition of matter, the essential ingredients of which consist of from 60 to 95 percent by weight of a normally hard thermoplastic copolymer of from 85 to 95 percent by weight of a monovinyl aromatic hydrocarbon of the benzene series having the vinyl radical directly attached to a carbon atom of the benzene nucleus and from 15 to 5 percent by weight of methacrylic acid, intimately incorporated with from 40 to 5 percent by weight of a rubbery copolymer of from 60 to 80 percent by weight of butadiene, from 35 to 5 percent by weight of styrene and from 5 to 15 percent by weight of a vinylpyridine.

2. A composition of claim 1, wherein the rubbery copolymer is a copolymer of butadiene, styrene and 4-vinylpyridine.

3. A resinous thermoplastic composition of matter, the essential ingredients of which consist of from 60 to 95 percent by weight of a normally hard thermoplastic copolymer of from 85 to 95 percent by weight of styrene and from 15 to 5 percent of methacrylic acid intimately incorporated with from 40 to 5 percent by weight of a rubbery copolymer of from 60 to 80 percent by weight of butadiene, from 35 to 5 percent by weight of styrene and from 5 to 15 percent by weight of a vinylpyridine.

4. A resinous thermoplastic composition of matter, the essential ingredients of which consist of from 60 to 95 percent by weight of a normally hard copolymer of about 90 percent by weight of styrene and about 10 percent of methacrylic acid intimately incorporated with from 40 to 5 percent by weight of a rubbery copolymer of from 60 to 80 percent by weight of butadiene, from 35 to 5 percent of styrene and from 5 to 15 percent of 4-vinylpyridine.

5. A resinous thermoplastic composition of matter, the essential ingredients of which consist of from 60 to 95 percent by weight of a normally hard copolymer of about 95 percent by weight of styrene and about 5 percent of methacrylic acid, intimately incorporated with from 40 to 5 percent by weight of a rubbery copolymer of from 60 to 80 percent by weight of butadiene, from 35 to 5 percent of styrene and from 5 to 15 percent of 4-vinylpyridine.

6. A resinous thermoplastic composition of matter, the essential ingredients of which consist of from 60 to 95 percent by weight of a normally hard copolymer of about 85 percent by weight of styrene and about 15 percent of methacrylic acid, intimately incorporated with from 40 to 5 percent by weight of a rubbery copolymer of from 60 to 80 percent by weight of butadiene, from 35 to 5 percent by weight of styrene and from 5 to 15 percent by weight of 4-vinylpyridine.

References Cited in the file of this patent

UNITED STATES PATENTS

| | | |
|---|---|---|
| 2,614,093 | Wheelock | Oct. 14, 1952 |
| 2,921,043 | Uraneck | Jan. 12, 1960 |
| 2,944,044 | Baer | July 5, 1960 |

OTHER REFERENCES

Whitby: "Synthetic Rubber," published in 1954 by Wiley & Sons, page 725.